(12) United States Patent
Vedsted et al.

(10) Patent No.: US 7,784,397 B2
(45) Date of Patent: Aug. 31, 2010

(54) METHOD AND APPARATUS FOR HEATING OR COOLING OF FOODSTUFFS

(75) Inventors: Lars Vedsted, Vadum (DK); Soren Vedsted, Vadum (DK); Kjeld Holmstrup, Aalborg (DK)

(73) Assignee: Laitram, L.L.C., Harahan, LA (US)

( * ) Notice: Subject to any disclaimer, the term of this patent is extended or adjusted under 35 U.S.C. 154(b) by 1027 days.

(21) Appl. No.: 10/598,721

(22) PCT Filed: Feb. 25, 2005

(86) PCT No.: PCT/DK2005/000129

§ 371 (c)(1),
(2), (4) Date: Sep. 8, 2006

(87) PCT Pub. No.: WO2005/085521

PCT Pub. Date: Sep. 15, 2005

(65) Prior Publication Data

US 2008/0271610 A1    Nov. 6, 2008

(30) Foreign Application Priority Data

Mar. 8, 2004    (DK) ............................... 2004 00384

(51) Int. Cl.
*A23L 3/22* (2006.01)
(52) U.S. Cl. .............................. 99/356; 99/470; 99/478; 99/483; 417/67; 426/519; 426/520; 426/524
(58) Field of Classification Search ................... 99/356, 99/357, 407, 409, 443 R, 443 C, 470, 478, 99/479, 483; 366/147, 149, 181.8, 220, 341; 417/65, 67; 415/73; 426/519, 520, 523, 426/524

See application file for complete search history.

(56) References Cited

U.S. PATENT DOCUMENTS

| 3,130,080 A | 4/1964 | Berger |
| 3,586,510 A | 6/1971 | Farkas et al. |
| 3,760,716 A * | 9/1973 | Stevenson, III ............... 99/536 |
| 4,410,281 A * | 10/1983 | Crookes ..................... 366/341 |
| 4,422,773 A * | 12/1983 | Cassaday et al. ............ 366/341 |
| 4,596,286 A | 6/1986 | Stetler |
| 5,275,091 A | 1/1994 | McFarlane et al. |

FOREIGN PATENT DOCUMENTS

GB              469771 A1     8/1937

* cited by examiner

*Primary Examiner*—Reginald L Alexander
(74) *Attorney, Agent, or Firm*—James T. Cronvich

(57) ABSTRACT

The invention relates to a method and a product for heating or cooling including freezing of food items in a rotating closed pipe serpent. The technology includes a closed non-circular rotating pipe serpent for processing of food items, where the food items are transported in a preparation liquid through the pipe serpent during either heating or cooling. The invention secures a gentle but efficient mixture of the food items that prevents clogging, which secures a homogeneous thermal processing of the individual food items, which again secures a high quality of the final food items. Simultaneously the products used for processing are easy to clean, which results in low costs. The process can be run entirely automatic without the involvement of manual labor, which results in minimal demands for process resources and ensures a high standard of hygiene. Several independent rotating pipe serpent units can be combined so that the food items can run through numerous successive heating- or cooling processes in batches or in a continuous flow. The process is suited for processing of many different types of food items such as meat, shellfish or vegetables whether these are going to be steamed, blanched or boiled in liquids such as water or oil.

24 Claims, 5 Drawing Sheets

METHOD AND APPARATUS FOR HEATING OR COOLING OF FOODSTUFFS

The invention relates to a method of heating or cooling including freezing of foodstuffs in a rotating closed pipe serpent.

The invention moreover relates to a product for heating or cooling including freezing of foodstuffs in a rotating closed pipe serpent.

The patent description U.S. Pat. No. 5,275,091 discloses a method and a product for heating or cooling foodstuffs, where the foodstuffs along with liquid for heating are carried into a closed rotating pipe serpent, and where the foodstuffs are cooked in the time it takes to pass through the whole screw conveyor.

It is in addition stated in the mentioned patent description that two spirals or helix structures can be linked together with the purpose of getting a continuous process with respectively heating in the first spiral and cooling in the next spiral.

It has been found, however, that this prior art as described in the above mentioned US patent involves some drawbacks.

Because the applied pipe serpents in a cross section of the axis of rotation are circular, the foodstuffs, which are feed into the spiral, will slide through the spiral without effectively being mixed with the liquid during the transport.

This has got the drawback that the foodstuffs such as shrimps, which clump together at the entry point of the spiral, will be transported through the spiral in the same lump. This will again imply that the different types of foodstuff, which are outermost placed, will heat-insulate from the inner foodstuffs of the lump, resulting in an inhomogeneous heating of each individual piece of foodstuff.

This inhomogeneous heating has the impact that some of the different types of foodstuff will not be sufficiently heated while other types of foodstuff can get superheated.

The result of the inhomogeneous heating- or cooling process is that the quality of the final product will be poor.

It is furthermore a problem with the multi-unit processes that foodstuffs from a spiral, must be guided into the next spiral, either by pumping in a conveying pipe or via a belt conveyor. The mentioned methods of transmission entails that the transmission of foodstuff will be delayed and/or the foodstuffs are placed under strain or the process will be more complicated or expensive due to the need for extra components or machinery parts.

Accordingly, an object of the invention is to improve the known method and the known product.

The object of the invention is achieved by a method characterized in that the rotating closed pipe serpent in a cross section of the axis of rotation is shaped non-circular such as waved or multi angled including triangle- or four-sided shape.

In this way it thus becomes possible to avoid that the different types of foodstuff form lumps. This is avoided by the non-circular design of the spiral, which ensures that clogging is split and is mingled at each touch with the non-circular shape. When clogging is avoided the single types of foodstuff such as shrimps will become homogeneously heated, which ensures a high quality of the final product.

It is also a characteristic feature of the invention that the entry point of the rotating closed pipe serpent, where the foodstuffs are conveyed, is shaped as an ejector pipe with an increased area of cross section from the point of entry toward the outflow into the pipe serpent.

The rotating closed pipe serpent will, in case the lower pipe volume is covered with fluid or liquid, act and/or work as an Archimedean spiral pump, and thereby create a vacuum on the entrance side of the pipe serpent. This vacuum can be used to suck foodstuff into the pipe serpent. The suction or absorption capacity can, however, be increased in a significant scale by the use of a so-called ejector pipe in the point of entry, where the ejector pipe is characteristic in that the cross-sectional area of the pipe is increased from the input opening towards the rotating closed pipe serpent.

The enhanced absorption capacity ease conveyance of foodstuffs to the rotating pipe serpent whether the foodstuff is added in a continuous process or in so-called batches.

As mentioned, the invention also relates to a product.

This product is characterized in that the rotating closed pipe serpent in a cross section of the axis of rotation is shaped non-circular such as waved or multi angled including triangle- or four-sided shape.

Hereby a good mixture of foodstuff, such as shrimps, is ensured, which is feed into the pipe serpent, with homogeneous temperature processing of each single food element, which ensures a high quality of the end product.

The invention will now be explained more fully with reference to the drawing, in which.

Figure 1:
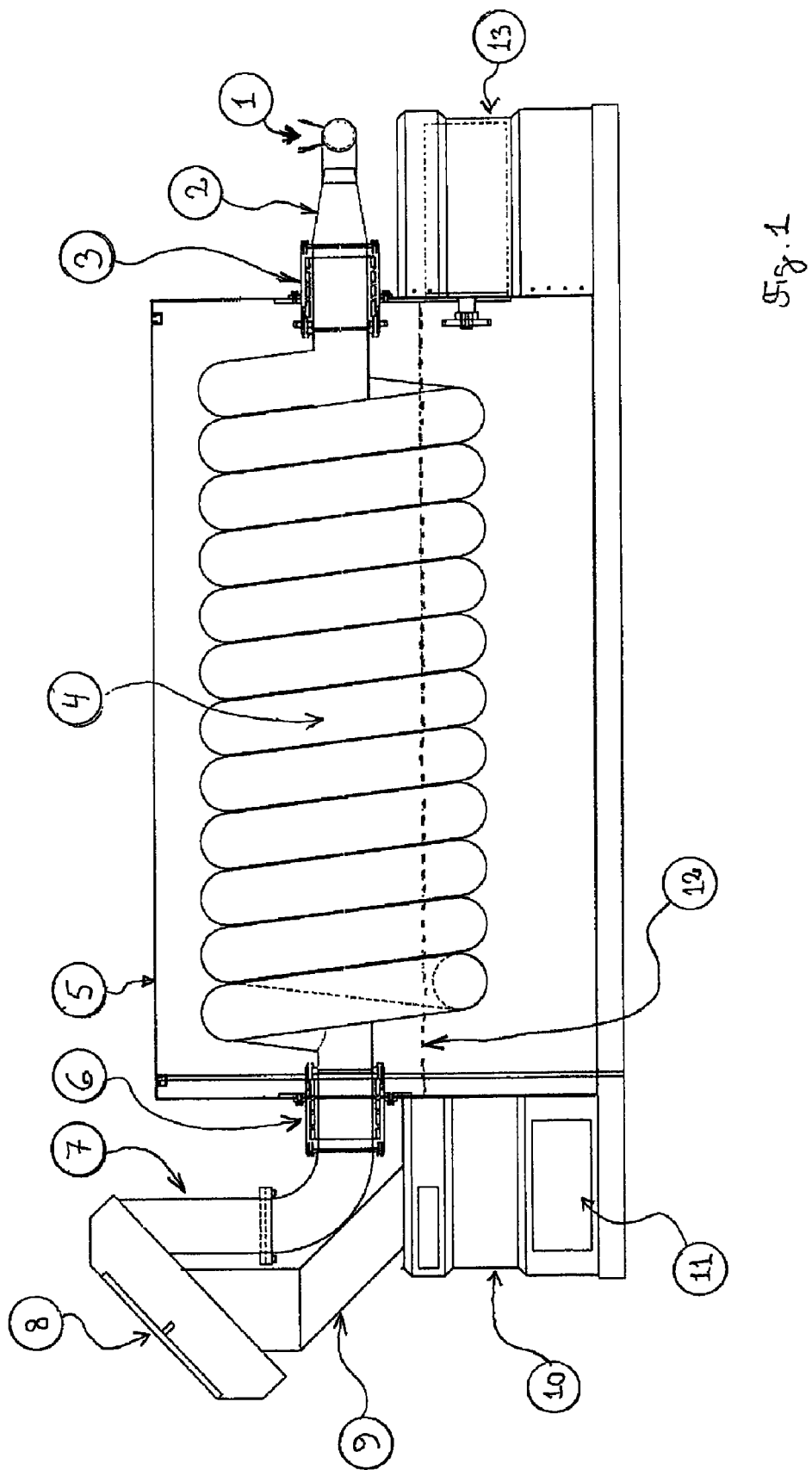
FIG. 1 shows, seen from the side, a closed rotating pipe serpent for heating of cooling of foodstuffs.

In FIG. 1 a key sketch of a product for heating or cooling foodstuffs based on the use of a rotating closed pipe serpent is shown.

The food items, and possible additives including one or more liquids of fluids, are conveyed at the feeding hopper 1, from where it is sucked or pumped into the rotating closed pipe serpent 4 via the ejector pipe 2.

The ejector pipe is characterized in that the inner cross-sectional area is increased from the entry funnel 1 towards the rotating closed pipe serpent 4, whereby a suction established via the pipe serpent is increased, and in doing so the conveyance of food items as well as related items such as liquid or fluid is eased.

The closed pipe serpent is rotating around an axis, which passes through the centre of the two end-pipe bearings 3 and 6. The pipe serpent is enclosed of a shielding 5.

The shielding 5 can be built liquid proof, whereby the pipe serpent can rotate in liquid or fluid as indicated by a height of liquid 12. If the pipe serpent is rotating in a liquid, the liquid could e.g. be heated and thereby assist the hot-shaping of food items, which passes through the pipe serpent 4.

In case the pipe serpent 4 is rotating in a fluid and/or liquid proof protective casing, the pipe serpent can also be sprinkled with heated or cool liquid and/or fluid with the purpose of assisting to the cooking or preparation of food items, as previously mentioned by rotation of a pipe serpent in a liquid and/or fluid. By sprinkling or e.g. by conveyance of steam the total weight of the food processing product can be reduced significantly in relation to rotation in liquid. This can be very attractive e.g. if the food processing product is used on board shrimp trawlers.

When the rotating pipe serpent is enclosed in the protective casing, the whole of the construction will be suitable to use on board ships in which the food machining process could be carried out even in relatively rough sea.

Cooling and freezing of food items can also be made if the food items in the pipe serpent are mixed with supercooled salt water, which can bring the food items down to a temperature below −20 degrees Celsius.

When the food items have passed through the whole of the closed rotating pipe serpent 4, they are guided away from the screw conveyor via the outlet pipe 7. In case the rotating closed pipe serpent 4 is filled with water to an extent where the lower part of the pipework is covered, the rotation pipe serpent will function as an Archimedean spiral pump, which can both create vacuum on the conveying side 1 and excess pressure on the output side, whereby the processed food items along with the liquid in the pipe are pressed through the outlet pipe 7 into the drainage grid 8, where the finished food items are separated from the liquid, with which the food items have been lead through the pipe serpent. The liquid can via the return pipe 9 be channeled back to the entrance funnel 1 and thereby be reused, in practice often after an expedient filtering.

When the conveyance liquid is reused the energy consumption for e.g. heating can be reduced to a minimum.

There can be used engines for rotating the closed pipe serpent 4, these are not shown on the drawing, but can be built-in in the console 10 or the console 13, which can also contain pumps, heating elements, filters, thermal sensors, videocameras, computers or anything else that is supposed to be used in a partially or fully automatic process control.

The consoles 10 and 13 can therefore with advantage be provided with inspection hatches 11, which eases the control and maintenance of the product.

As it will appear from FIG. 1, the rotating closes pipe serpent has got the obvious advantage that food items cannot be jammed during the transport from entry towards outlet from the pipe serpent.

The product will therefore be outermost gentle towards the food items, which are being processed, with high quality of the finished product as a result, as well as cleaning can normally be carried out simply by flushing the pipe serpent with a cleaning solving and/or fluid.

Figure 2:
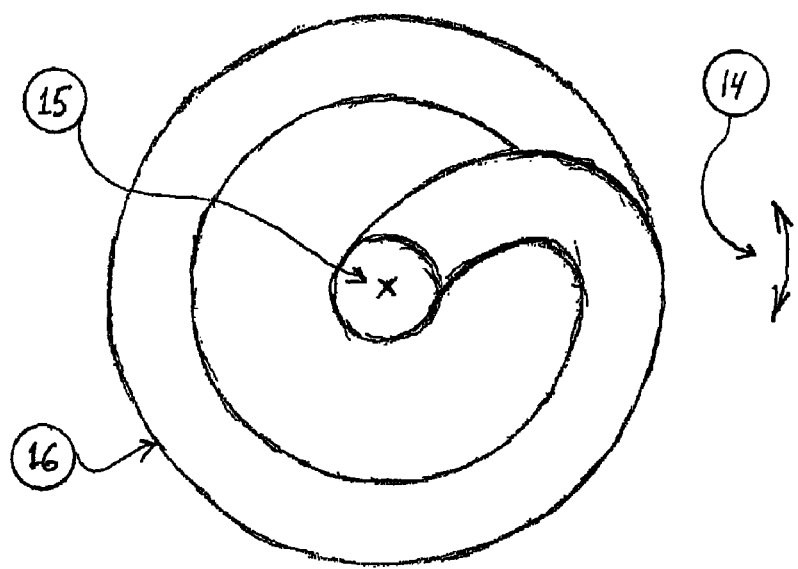
FIG. 2 shows, in a cross section of the axis of rotation, a circular shaped closed pipe serpent.

FIG. 2 shows, in a cross section of the axis of rotation, the profile of a circular shaped closed pipe serpent 16, which rotates around the axis of centres 15 in a direction as stated by 14. Such a circular design and shape of the pipe serpent results in an outermost gentle processing of food items, but on the other hand it does not result in a mixture of the food item and the associated liquid. Food items conveyed into such a circular spiral in lumps will thus pass through the whole spiral without the lump being spread. A lump of food items, e.g. shrimps that are going to be boiled, will in a lump be heated in an inhomogeneous way. The outermost shrimps in the lump will thermoisolate the innermost of the lump, and therefore the innermost shrimps will, in the worst case, get an inhomogeneous heating, which can result in an insufficient heating. This will obviously create a final product with a poor quality and thus low earning potential.

Figure 3:
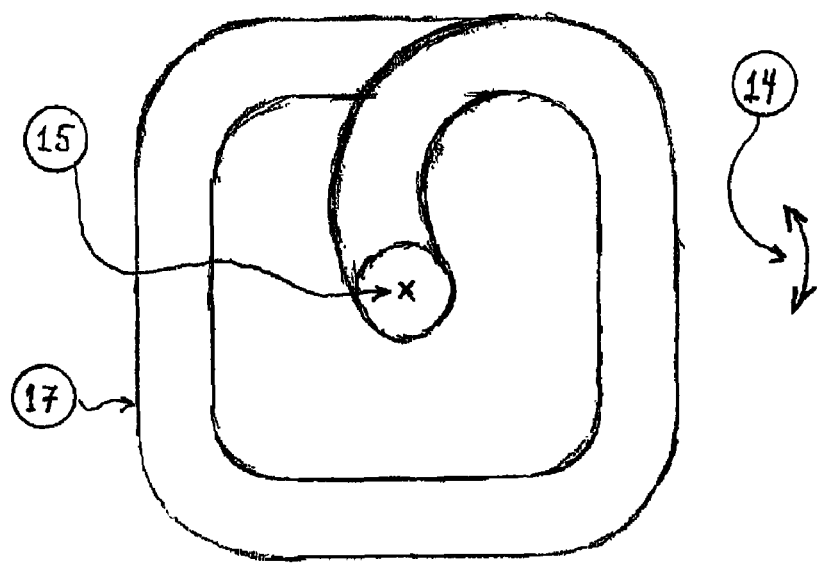
FIG. 3 shows, in a cross section of the axis of rotation, a square shaped closed pipe serpent.

FIG. 3 shows, in cross section of the axis of rotation, the profile of a square shaped closed pipe serpent 17 which rotates around the axis of center 15 in a direction as specified by 14. Such an angular layout of the rotating pipe serpent will in contrast to the circular spiral shown in FIG. 2 ensure an optimum mixture of food items with a joint propelling- and processing fluid. A gathering of e.g. shrimps, which have formed lumps at the entry into the screw conveyor, will be separated each time a non-circular shape is hit. For the shown square profile, shown in FIG. 3, a lump of shrimps will thus be spread four times for every turn of rotation the spiral performs.

Figure 4:
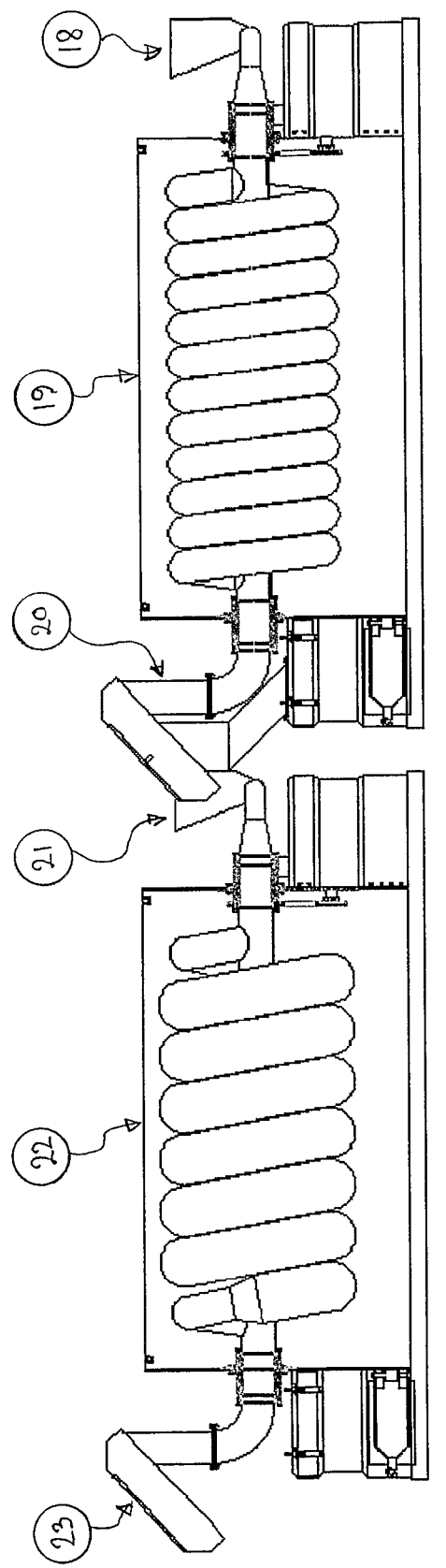
FIG. 4 shows a product for both heating and cooling of foodstuffs based on two separate rotating closed pipe serpents.

In FIG. 4 an elementary sketch of a product for a combined heating- and cooling process of food items is shown. The food items as well as any appropriate liquid is supplied to the product by the inlet funnel 18 in order to subsequently pass through the closed rotating pipe serpent, which is placed in the heating module 19. When the food item has been transported through the whole heating pipe serpent the food items are redirected via outlet pipe 20 to the inlet 21 by the cooling module 22, which also contains a closed rotating pipe serpent, which is used for cooling. The finished cooled product can be delivered via the drain grid 23.

The use of the shown type of transition pipe 20 can in some applications expose the food items for more load and stress than intended. This can happen in case the food items have got to be pumped up through the pipes in order to achieve a potential energy, ensuring that the transfer into the next pipe serpent can be driven solely by the use of gravity.

Figure 5:
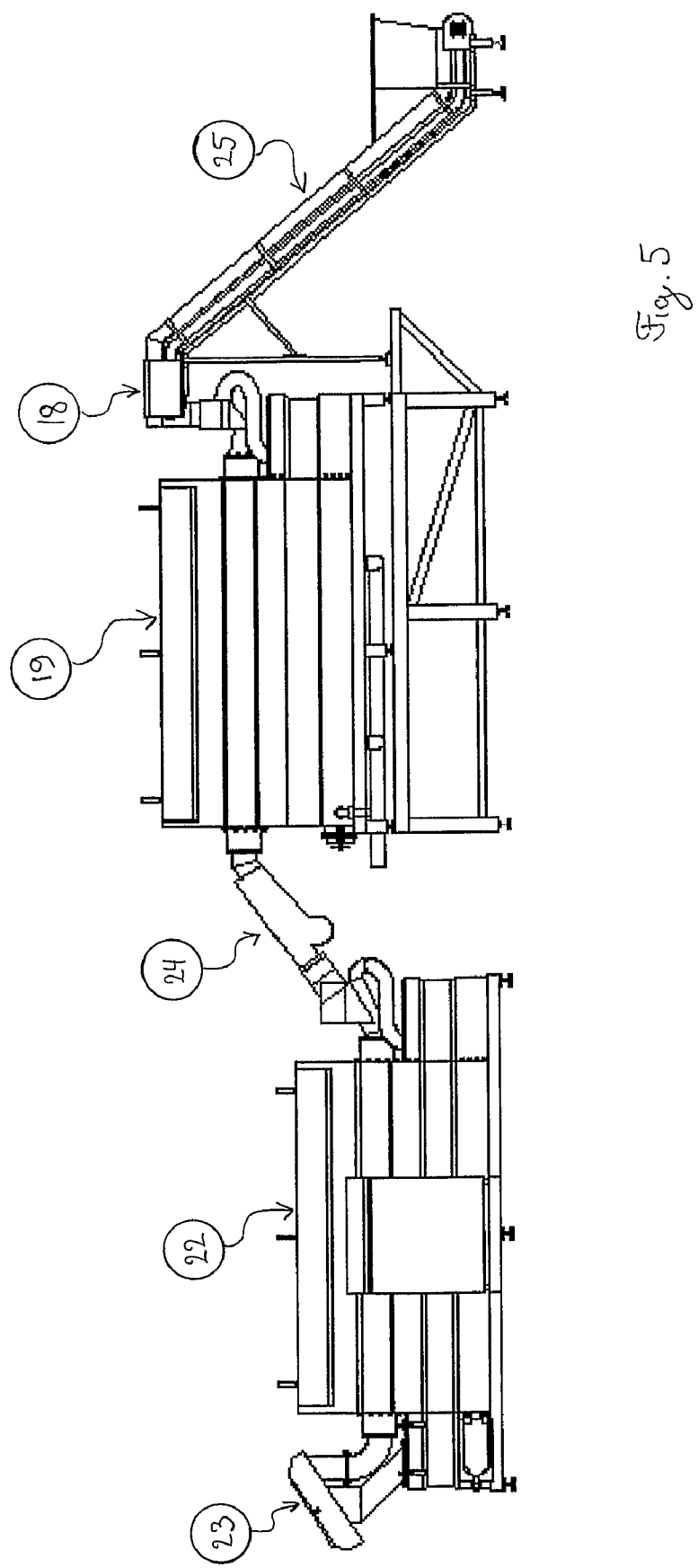
FIG. 5 shows two compound pipe serpent systems where one is offset in the height in relation to the other.

In FIG. 5 a combined heating and cooling system is shown, where the first spiral of processing 19 is lifted in the height in relation to the secondary processing spiral 22. In this way the interconnector pipe 24 between the two units becomes very short and hereby can prevent the need for the tough pumping of the foodstuffs. The result of raising the first processing spiral in relation to the following is a more effective and less stressful handling of the food items, resulting in a high quality of the final product.

Figure 6:
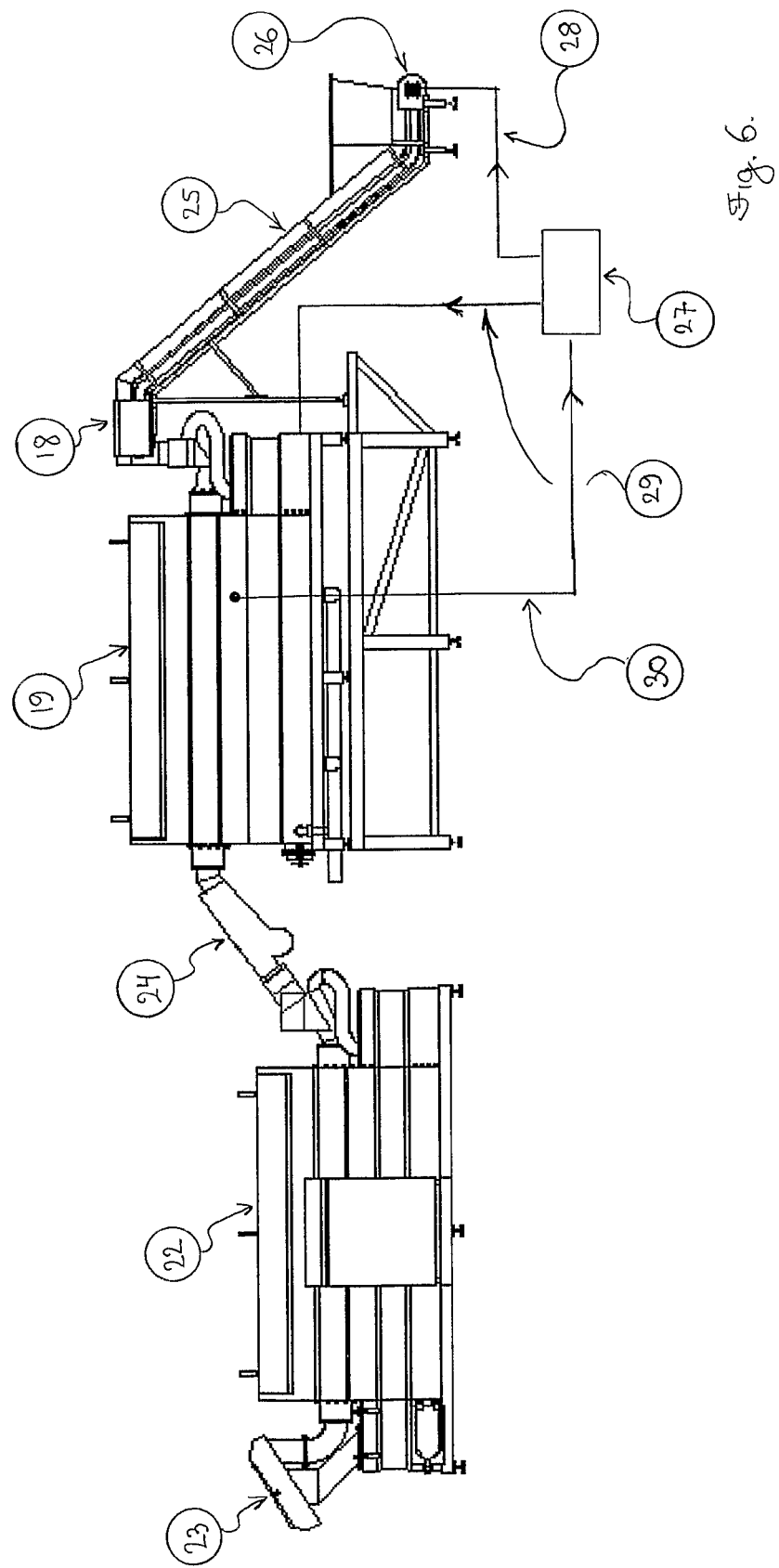
FIG. 6 shows, as FIG. 5, two composite pipe serpent systems, mutually displaced in the height, with control unit for control of spiral rotation speed and foodstuff supply belt speed.

FIG. 6, shows as FIG. 5, a combined processing system consisting of two connected pipe serpent units 19 and 22, which are mutually differenced in height. The conveyance of food items into the first pipe serpent happens via the belt conveyor 25, which is driven by an engine 26.

In order to achieve an optimum thermal processing of the food items the system is operated by a control unit 27, which typically consists of some programmable digital electronic units including microprocessors. The control unit 27 controls via a control signal 28, the speed of the loading chute 25, whereby the quantity and the speed of the food items, which are conveyed into the screw conveyor 19, can be controlled.

The control unit 27 can simultaneously, via a control signal 29, control the speed of rotation of the screw conveyor 19, which is typically used for heating food items.

As an input parameter for the controls the control unit 27 can e.g. use the temperature of the food items in the rotating pipe serpent, which via a signal cable 30 can be transmitted from the spiral 19 to the control unit 27.

By the use of the above mentioned procedure it is thus possible to synchronize the supply of food items with the rotational speed of the spiral, e.g. controlled by the temperature of the content of the pipe serpent or controlled by the absorption capacity at the entry point of the spiral, which is a function of the angular position of the spiral.

By the use of a control unit 27 other parameters than the temperature and/or the absorption capacity at the entry point can obviously be used for regulation, just like other functions than the speed of the loading chute and the rotational speed of the spiral 19 can be adjusted.

By the use of a control unit 27 the entire thermal machining process can be optimized, so that the final product will get a pre-process specified high and uniform quality.

The detailed description of the modules with reference to FIG. 1 to FIG. 3, can naturally be applied to any single or combined module regardless of the thermal function such as cooling or heating.

Any combination or any number of closed rotating pipe serpents including any sequence of thermal foodstuff processing is a part of the invention.

In addition the invention includes any other procedures and/or devices than the above directly described or shown, including all combinations of procedures and/or devices, which can indirectly be derived from the above figures or text.

Appropriate embodiments of products included in the invention can with advantage often be manufactured from non-toxic rust-proof materials such as rust-proof steel alloys.

The invention claimed is:

1. A method of heating or cooling including freezing foodstuffs, the method comprising:
   rotating a first spiral closed pipe serpent about an axis of rotation that extends between an entrance side through which foodstuffs enter the first closed pipe serpent and an opposite output side through which the foodstuffs exit the first closed pipe serpent and characterized in that the rotating first closed pipe serpent in a cross section of the axis of rotation has a non-circular, multi angled shape encircling the axis of rotation;
   supplying foodstuffs to the first closed pipe serpent at an entry point at the entrance side to be sucked into the first closed pipe serpent and conveyed in a spiral path about the axis of rotation to the opposite output side by the rotation of the first closed serpent about the axis of rotation; and
   synchronizing the supply of foodstuffs to the first pipe serpent with at least one of the rotational speed and the angular position of the first pipe serpent by controlling the speed of loading the foodstuffs into the first pipe serpent.

2. The method of claim 1 characterized in that the entry point of the rotating first closed pipe serpent, where the foodstuffs are supplied at the entrance side of the first closed pipe serpent, is shaped as an ejector pipe with an increased area of cross section from the entry point toward the entrance side of the first closed pipe serpent.

3. The method of claim 1, further comprising:
   rotating a second closed pipe serpent about a second axis of rotation at a displaced horizontal level from the axis of rotation of the first closed pipe serpent; and
   supplying foodstuffs exiting the output side of the first closed pipe serpent to the entry point of the second closed pipe serpent.

4. The method of claim 1 further comprising:
   mixing the foodstuffs in the first closed pipe serpent with supercooled salt water.

5. The method of claim 1 further comprising:
   sprinkling the first closed pipe serpent with a heated or cool liquid.

6. The method of claim 1, further comprising:
   rotating a second closed pipe serpent about a second axis of rotation;
   supplying foodstuffs exiting the output side of the first closed pipe serpent to the entry point of the second closed pipe serpent;
   covering the lower part of the first closed pipe serpent with a heated fluid to cook foodstuffs in the first closed pipe segment; and
   covering the lower part of the second closed pipe serpent with a cooled fluid to cool foodstuffs in the second closed pipe segment.

7. Apparatus for heating or cooling including freezing foodstuffs, the apparatus comprising:
   a rotating first spiral closed pipe serpent extending from an entrance side through which foodstuffs enter the first closed pipe serpent to an opposite output side through which the foodstuffs exit the first closed pipe serpent,
   wherein the rotating first closed pipe serpent rotates about an axis of rotation extending between the entrance side and the output side, and
   wherein, in a cross section of the axis of rotation, the first closed pipe serpent has a non-circular, multi angled shape encircling the axis of rotation, and
   a control unit receiving a signal representing the temperature of foodstuffs in the first closed pipe serpent and sending a control signal to control the speed of rotation of the first closed pipe serpent.

8. Apparatus as in claim 7 wherein the non-circular shape of the first closed pipe serpent is selected from the group of shapes including triangular and square shapes.

9. Apparatus as in claim 7 further comprising a similarly shaped second closed pipe serpent rotating about an axis of rotation at a displaced horizontal level from the axis of rotation of the first closed pipe serpent, wherein foodstuffs exiting the output side of the first closed pipe serpent enter the second closed pipe serpent at the entrance side of the second pipe serpent.

10. Apparatus as in claim 7 further comprising a similarly shaped second closed pipe serpent rotating about an axis of rotation, wherein foodstuffs exiting the output side of the first closed pipe serpent enter the second closed pipe serpent at the entrance side of the second pipe serpent, and wherein a lower part of the first closed pipe serpent is covered in a heated fluid and a lower part of the second closed pipe serpent is covered in a cooled fluid.

11. Apparatus as in claim 7 further comprising an ejector pipe connected to the entrance end of the first closed pipe serpent for introducing foodstuffs into the first closed pipe serpent, wherein the ejector pipe has an inner cross-sectional area that increases toward the entrance side of the first closed pipe serpent.

12. Apparatus as in claim 7 further comprising a loading chute supplying foodstuffs to the closed pipe serpent at the entrance side and wherein the control unit sends a second control signal to control the quantity and speed of the foodstuffs supplied by the loading chute.

13. Apparatus for heating or cooling including freezing foodstuffs, the apparatus comprising:
   a rotating first spiral closed pipe serpent extending from an entrance side through which foodstuffs enter the first closed pipe serpent to an opposite output side through which the foodstuffs exit the first closed pipe serpent,
   wherein the rotating first closed pipe serpent rotates about an axis of rotation extending between the entrance side and the output side, and
   wherein, in a cross section of the axis of rotation, the first closed pipe serpent has a non-circular, multi angled shape encircling the axis of rotation,
   a shielding enclosing the first closed pipe serpent and filled to a level with a heated or cooled fluid covering a lower part of the first pipe serpent;
   a drainage grid at the output side of the first closed pipe serpent through which liquid exiting the closed pipe serpent with the foodstuffs is separated from the foodstuffs; and
   a pipe leading from the drainage grid to the shielding to channel the liquid into the fluid in the shielding.

14. Apparatus as in claim 13 wherein the non-circular shape of the first closed pipe serpent is selected from the group of shapes including triangular and square shapes.

15. Apparatus as in claim 13 further comprising a similarly shaped second closed pipe serpent rotating about an axis of rotation at a displaced horizontal level from the axis of rotation of the first closed pipe serpent, wherein foodstuffs exiting the output side of the first closed pipe serpent enter the second closed pipe serpent at the entrance side of the second pipe serpent.

16. Apparatus as in claim 13 further comprising a similarly shaped second closed pipe serpent rotating about an axis of rotation, wherein foodstuffs exiting the output side of the first closed pipe serpent enter the second closed pipe serpent at the entrance side of the second pipe serpent, and wherein a lower part of the first closed pipe serpent is covered in a heated fluid and a lower part of the second closed pipe serpent is covered in a cooled fluid.

17. Apparatus as in claim 13 further comprising an ejector pipe connected to the entrance end of the first closed pipe serpent for introducing foodstuffs into the first closed pipe serpent, wherein the ejector pipe has an inner cross-sectional area that increases toward the entrance side of the first closed pipe serpent.

18. Apparatus as in claim 13 further comprising a loading chute supplying foodstuffs to the closed pipe serpent at the entrance side and a control unit sending a control signal to control the quantity and speed of the foodstuffs supplied by the loading chute.

19. A method of heating or cooling including freezing foodstuffs, the method comprising:
   rotating a first spiral closed pipe serpent about an axis of rotation that extends between an entrance side through which foodstuffs enter the first closed pipe serpent and an opposite output side through which the foodstuffs exit the first closed pipe serpent and characterized in that the rotating first closed pipe serpent in a cross section of the axis of rotation has a non-circular, multi angled shape encircling the axis of rotation;
   supplying foodstuffs to the first closed pipe serpent at an entry point at the entrance side to be sucked into the first closed pipe serpent and conveyed in a spiral path about the axis of rotation to the opposite output side by the rotation of the first closed pipe serpent about the axis of rotation;
   covering a lower part of the first closed pipe serpent in a heating or cooling fluid;
   separating liquid from foodstuffs exiting the first closed pipe serpent; and
   returning the liquid separated from the foodstuffs to the heating or cooling fluid.

20. The method of claim 19 characterized in that the entry point of the rotating first closed pipe serpent, where the foodstuffs are supplied at the entrance side of the first closed pipe serpent, is shaped as an ejector pipe with an increased area of cross section from the entry point toward the entrance side of the first closed pipe serpent.

21. The method of claim 19, further comprising:
   rotating a second closed pipe serpent about a second axis of rotation at a displaced horizontal level from the axis of rotation of the first closed pipe serpent; and
   supplying foodstuffs exiting the output side of the first closed pipe serpent to the entry point of the second closed pipe serpent.

22. The method of claim 19 further comprising:
   mixing the foodstuffs in the first closed pipe serpent with supercooled salt water.

23. The method of claim 19 further comprising:
   sprinkling the first closed pipe serpent with a heated or cool liquid.

24. The method of claim 19 further comprising:
   rotating a second closed pipe serpent about a second axis of rotation;
   supplying foodstuffs exiting the output side of the first closed pipe serpent to the entry point of the second closed pipe serpent;
   covering the lower part of the first closed pipe serpent with a heated fluid to cook foodstuffs in the first closed pipe segment; and
   covering the lower part of the second closed pipe serpent with a cooled fluid to cool foodstuffs in the second closed pipe segment.

* * * * *